United States Patent [19]
Blackmon, Jr.

[11] Patent Number: 5,980,049
[45] Date of Patent: Nov. 9, 1999

[54] SENSOR ASSEMBLY WITH DUAL REFLECTORS TO OFFSET SENSOR

[75] Inventor: James Bertram Blackmon, Jr., Brownsboro, Ala.

[73] Assignee: McDonnell Douglas Corporation, St. Louis, Mich.

[21] Appl. No.: 09/169,766

[22] Filed: Oct. 12, 1998

Related U.S. Application Data

[62] Division of application No. 08/278,941, Jul. 22, 1994, Pat. No. 5,896,237.

[51] Int. Cl.⁶ .................................. G02B 5/10; H01J 3/14
[52] U.S. Cl. ......................... 359/858; 359/861; 359/845; 250/216; 250/228
[58] Field of Search ...................................... 359/845, 850, 359/851, 852, 856, 857, 858, 859; 250/208.1, 216, 228; 356/236; 126/685, 688, 690, 701

[56] References Cited

U.S. PATENT DOCUMENTS

| | | | |
|---|---|---|---|
| 3,130,308 | 4/1964 | Astheimer | 250/83.3 |
| 3,164,781 | 1/1965 | Goldberg | 357/858 |
| 3,647,284 | 3/1972 | Elings et al. | 350/294 |
| 3,664,750 | 5/1972 | Hock | 359/858 |
| 3,790,257 | 2/1974 | Goldstein et al. | 359/845 |
| 3,827,778 | 8/1974 | Wheeler | 359/858 |
| 3,838,277 | 9/1974 | Morgenstern | 250/216 |
| 4,017,163 | 4/1977 | Glass | 359/858 |
| 4,189,236 | 2/1980 | Hogg et al. | 359/859 |
| 4,395,126 | 7/1983 | Kramer | 250/228 |
| 4,404,592 | 9/1983 | Pepin et al. | 358/125 |
| 4,453,180 | 6/1984 | Juergensen | 250/228 |
| 4,695,139 | 9/1987 | Bagby et al. | 359/851 |
| 4,815,858 | 3/1989 | Snail | 356/446 |
| 4,932,779 | 6/1990 | Keane | 250/228 |
| 4,952,042 | 8/1990 | Pinson | 350/567 |
| 5,519,534 | 5/1996 | Smith et al. | 250/228 |
| 5,896,237 | 4/1999 | Blackmon, Jr. | 359/858 |

FOREIGN PATENT DOCUMENTS 0805238 2/1981 U.S.S.R. ................ 359/858

OTHER PUBLICATIONS

Folweiler, et al., Arc Image Furnace System For Electrical Conductivity And Thermal Expansion Measurements, *The Review Of Scientific Instruments*, vol. 36, No. 6, Jun. 1965, pp. 747–749.

*Primary Examiner*—Ricky D. Shafer
*Attorney, Agent, or Firm*—Alston & Bird LLP

[57] ABSTRACT

Radiant energy sensor is protected from severe environments with a radiant energy sensor assembly that off-sets the sensor from the environment. The sensor assembly includes a radiant energy sensor, a pair of reflective walls facing one another, one of the walls having a transmissive aperture for receiving radiant energy over a wide angle of incidence, an entry, the other wall having a transmissive aperture for passing energy from behind the wall to the sensor, an exit, with the walls having the reflection characteristics such that the radiant energy entering the entry aperture at any angle is always reflected to the exit aperture. The reflective walls may be paraboloids or Fresnel surfaces in geometry.

19 Claims, 5 Drawing Sheets

SENSOR ASSEMBLY WITH DUAL REFLECTORS TO OFFSET SENSOR

RELATED APPLICATIONS

This application is a divisional of U.S. patent application Ser. No. 08/278,941 filed Jul. 22, 1994, now U.S. Pat. No. 5,896,237.

FIELD OF THE INVENTION

This invention relates to sensor devices for sensing radiant energy, including optical images, thermal images, infrared and other radiation and, more particularly, to a sensor support structure for protecting the sensor against damage from harsh ambient conditions experienced during operation.

BACKGROUND

Sensors are used to view objects and/or ambient conditions in varied environments and often under severe conditions. Millimeter wave, visible and infra-red sensors are used to guide supersonic missiles through the atmosphere to intercept reentry vehicles. Radiometers are required to assess radiation heat transfer of aerobrake vehicles as the vehicle re-enters the atmosphere. In high temperature manufacturing processes, plasma furnaces, rocket engines and the like heat flux, radiation characteristics, and temperature are required to be observed and measured. Sensor's are also used to observe nuclear explosions and become exposed to gamma rays and particles, high intensity light and infra-red radiation.

Severe environments place constraints on sensor design and the apertures through which the sensor's view or measure conditions. To protect the sensors from damage, special techniques have been used: Cooled, high temperature windows, protective shrouds and special cooling techniques have been used, all of which incur increased cost, add weight, and detract from the sensor's performance. Further, time dependent temperature changes and gradients in the sensor's protective observation window changes the window's refractive index, causing image distortion and dispersion.

Current requirements for protecting sensors in interceptor vehicle application, while permitting a wide field of regard, on the order of tens of degrees or so, and modest fields of view, on the order of degrees necessitates complex arrangements of high temperature high strength transparent windows formed of costly specialized materials, special relay mirrors located between the window and sensor, and/or special cooling techniques to protect the windows and sensor from exceptionally high aerodynamic heat flux and pressure. In particular, the coolant and coolant flow control systems represent a substantial fraction of the weight of the interceptor; and the volume required to house the cooling and flow control system adds substantially to the mass, size and cost of the interceptor. Coolant flow over the observation window induces turbulence and refractive effects that degrade the image.

One technique devised to provide protection for the sensor is to modify the nose cones structure to form a deep depression or well in the fore section of the nose cone. The sensor is placed at the bottom of that well. As a consequence the heating of the sensor that occurs from the friction of onrushing air is reduced. That technique requires the sensor to be placed along the longitudinal axis of the nose cone. It is less effective and may be ineffective when used in a non-symmetric orientation and at non-zero angles of attack. Because the sensor is deeply embedded in the nose cone, the sensor's field of view is necessarily limited and the space vehicles overall length and, hence, mass is necessarily larger than otherwise. Because the nose cone geometry is modified for the foregoing technique, concerns develop as to the effects on aerodynamic control, thermal control and protection of the nose cone tip region and must be addressed.

Another technique proposed is to employ a "jettisonable" shroud to protect the sensor during atmospheric flight. When the space vehicle attains a sufficiently high altitude, the shroud is jettisoned, typically with an explosive device, uncovering the sensor. The sensor is then used at near-vacuum condition, where heat and pressure are insignificant. At best, this technique is believed to be impractical. For endoatmospheric interception, the technique is ineffective.

An object of the invention is to protect a radiant energy sensor from damage as could be caused by sensing applications in harsh environments.

Another object of the invention is to provide the sensor apparatus for use in missiles capable of providing images whose quality is not degraded by thermal effects or require levels of coolant characteristic of the prior sensors in that application.

An additional object of the invention is to provide a support structure of simple construction for mounting a sensor that permits the sensor to be displaced or offset from the environment being sensed so as to at least partially isolate the sensor from such environment and, thereby protect the sensor from physical damage, without adversely affecting the integrity of readings supplied by the sensor.

As futher background, U.S. Pat. No. 3,657,284 granted Mar. 7, 1972 to Elings and Landry discloses an optical display device in which a small colored marble reposed in a cavity appears as a real image of the marble located in a position above the device, giving the illusion that the marble is positioned where it is not and allowing one to run one's hand through a seemingly solid object to one's amusement. To accomplish that illusion the cavity walls are defined by two parabaloid mirrored surfaces, the upper or top surface at which the image appears containing a central aperture, and the focus of the upper paraboloid being coincident in position with the vertex of the bottom wall, on which the marble is positioned. The foregoing novelty device showed a structure as would produce a real image of an object confined in the cavity to the outside to astonish and serve to amuse the lay person.

The present invention builds upon the principles inherent in the foregoing discovery in a novelty device that is unrelated to sensor apparatus, and provides a unique sensor support structure that offsets the position of the sensor and thereby protects the sensor from physical damage or degradation from the environment being sensed, and thereby provide a new and useful sensor apparatus.

SUMMARY OF THE INVENTION

In accordance with the present invention, a radiant energy sensor assembly comprises a radiant energy sensor, a pair of radiant energy reflective walls facing one another, with a first one of the walls having an energy transmissive aperture for receiving radiant energy over a wide angle of incidence, an entry, and the other wall having an energy transmissive aperture for propagating energy to the sensor, an exit, with the walls having the reflection characteristics that the radiant energy that enters the entry aperture at any angle is always reflected to the exit aperture, either at the same angle or the opposite angle, depending on the position and configuration of the reflective walls. Effectively, the sensor is offset or isolated from the energy source by the walls. In one specific embodiment the reflective walls are mirrored and of a paraboloid in geometry. In another the walls are Fresnel type mirrors. In still other constructions, the walls are a combination of both the preceding types of mirrors.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE PREFERRED EMBODIMENTS

Figure 1:
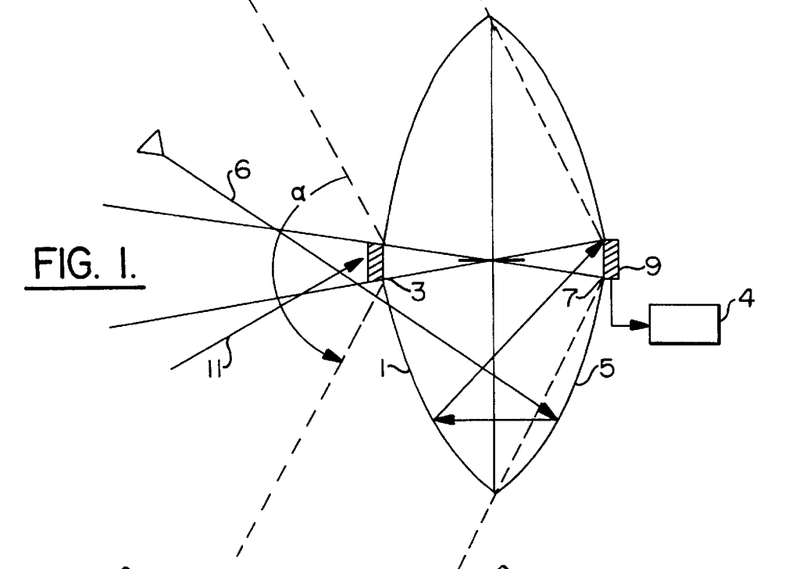
FIG. 1 symbolically illustrates a sensor assembly constructed according to the invention, employing dual paraboloid mirrors to offset the sensor.

Reference is made to FIG. 1, which symbolically illustrates an embodiment of the invention in two dimensional view. This includes a pair of curved light reflecting mirrors, 1 and 5, and a sensor 9. The foregoing mirrors are three dimensional curved surfaces, but the structure and operation are more easily understood with the two dimensional view presented in the figure. Mirror 1 is suitably formed of a thin metal sheet, having a mirrored inner surface, such as highly polished coated aluminum or silver, and contains a small aperture centrally located on the mirror's axis. The mirror is a paraboloid in geometry, and its section view illustrated in the figure is a parabola. That is much the same curved shape as seen in microwave and satellite dish antennas, themselves reflecting surfaces of RF energy. The mirror may be visualized as a curved saucer with a hole in the center. Mirror 5 is of essentially identical construction as mirror 1 and contains a central aperture 7.

The two mirrors are oriented in opposite directions with their mirrored surfaces facing one another to define a space or cavity. The vertex of mirror 1 is located coincident with the focus of mirror 5; and, conversely, the vertex of mirror 5 is located coincident with the focus of mirror 1. This places the apertures in alignment and on the principal axis of the mirrors. The two mirrors are fastened together by any suitable means, such as welding, adhesive bonds or mechanical clamps, bolts and the like. As desired, the outer surface of the mirrors can be coated with various materials and/or treated to enhance cooling by re-radiation or by convection as necessitated by a particular application to which the sensor device is applied.

Sensor 9 is any conventional photoelectric sensor, such as a photovoltaic or Infra-Red sensor or a camera lens. The sensor is rigidly mounted to mirror 5, by conventional means, such as adhesive bonding, clamping or the like with the active sensor surface being located within aperture 7. The sensor's output is connected to conventional electronic measuring and/or display apparatus, not illustrated, which is entirely conventional in structure. It is appreciated that the sensor's output is coupled to electronic equipment of conventional structure for processing and/or displaying electronic signals from the sensor. The kind and type of electronic equipment employed depends in part upon the sensor's construction, and that in turn depends upon the particular function that the sensor is to perform. Since the present invention is in the sensor's support and does not involve changes to the structure of the sensor itself or to the associated electronic equipments, there is no need to illustrate or describe details of those elements.

When the completed assembly is viewed from the front, an image 11 of sensor 9 appears at the front of aperture 3, and gives the illusion that the sensor is located at the front, when, in fact, the actual sensor is off set in position and is at the position of the lower mirror. Aesthetically the real image generated is much the same as in the novelty display device described in U.S. Pat. No. 3,647,284, earlier discussed. In operation as a sensor assembly, sensor 9, although offset from aperture 3, has a wide field of view. It is as if the objects in front of the assembly are being viewed by the real image 11. In the conventional embodiment illustrated, the acceptance angle at the sensor is reversed. However, the reversal is easily handled by conventional sensor electronics, if required. Alternately, the mirrors can be placed and configured as shown in U.S. Pat. No. 3,647,284 to provide a view that is not reversed.

According to established optical principles, only light rays perpendicular to a parabola's directrix, parallel to the axis, pass through the parabola's focus upon reflection from the parabolic surface. When a like parabolic mirror is placed with its vertex coinciding with the first parabolic surface's focus, those light rays are incident at the vertex. When a light ray instead strikes the parabolic mirror at an angle, it is reflected perpendicular to the parabola's directrix, parallel to the axis. With the coupled mirrors, the two effects are combined.

As illustrated in the figure, a beam of light passing through aperture 3 is incident upon the mirrored surface of mirror 5. In accordance with well established laws of optics, the beam is reflected from that surface in a line parallel to the mirror's axis and is incident upon the internal mirrored surface of mirror 1, from which it is again reflected. Since the beam arrives at mirror 1 parallel to the axis, the beam is reflected from mirror 1 to the parabolic mirror's focal point, whereby the reflected beam is incident on a portion of sensor 9's surface.

The size of the aperture is dependent on such factors as the signal to noise ratio. In particular, for very dim objects, the aperture may be required to be on the order of an inch or so in diameter for the mirrors of the order of six inches in diameter, to provide sufficient light gathering power to enable proper functioning of the sensor. That is particularly acute when the sensor apparatus is applied in interceptor missiles. For applications in which well lighted objects or objects at a high temperature are viewed, the aperture may be very small. Preferably, in practice, the diameter of the mirror should be of the order of at least five to ten times the aperture diameter and/or sensor diameter, to ensure optically correct signals.

Given an understanding of the preceding embodiment and the optical principles involved in the operation, the various modifications and improvements, next addressed, are more easily understood.

Figure 2:
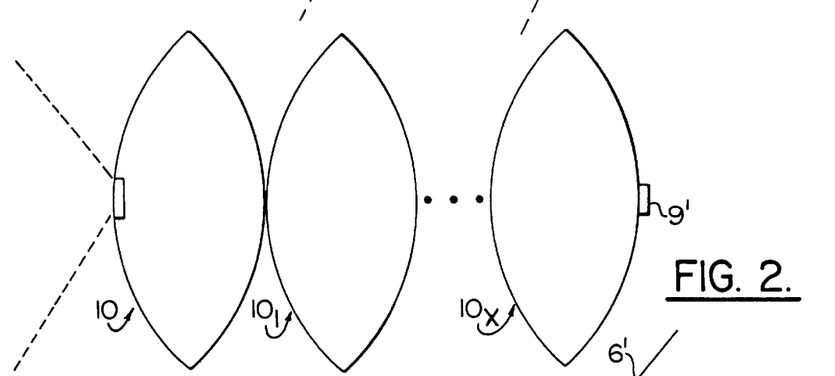
FIG. 2 symbolically illustrates another sensor assembly that uses multiple dual paraboloid mirrors.

As symbolically illustrated in FIG. 2, additional dual coupled mirror arrangements may be combined serially to form a multiple side by side arrangement of coupled mirror combinations, only three of which, 10, $10_1$ and $10_x$ are illustrated. Thus the coupled mirror combination 10, which is identical to mirrors 1 and 5 in FIG. 1, is optically coupled via its rear aperture to the front aperture in the adjacent mirror combination $10_1$; the rear aperture of combination $10_1$ is connected to the next adjacent mirror, not illustrated and represented by the three dots, and, so on, with the rear aperture in the next to last coupled mirror combination being optically coupled to the front aperture of the last mirror combination 10x; and the rear or output aperture of the last mirror combination 10x being coupled to sensor 9'. Such an arrangement permits the sensor to be displaced at greater distances from the input end for increased isolation from the input end's environment. The number of such mirror combinations that may be placed in series as described is limited by the light reflectance loss as occurs in each mirror, with the individual losses being cumulative. High wall reflectivity, greater than 90%, is expected in practice. Further, the light gathering power of the individual mirrors can be increased to offset reflectance losses by increasing the mirror size, aperture size, and, as later herein described in connection with the embodiment of FIG. 3, through use of focusing lenses to direct light on the sensor.

Figure 3:
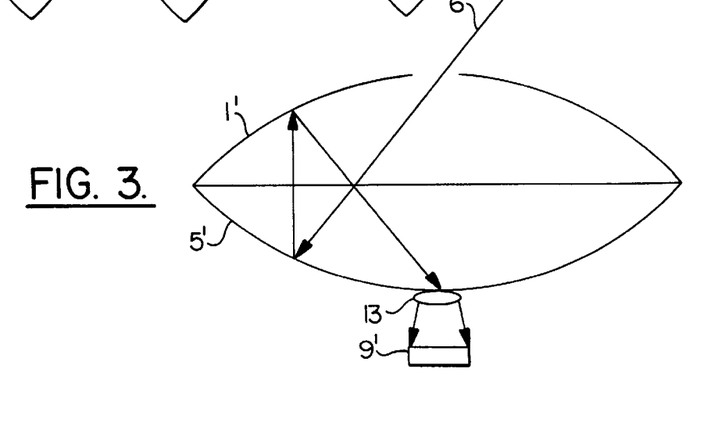
FIG. 3 illustrates a refinement on the embodiment of FIG. 1 that contains a lens to focus light on the sensor.

As symbolically illustrated in FIG. 3, the sensor pick up includes an expander lens 13 at the rear aperture located in front of sensor 9'. Thus light rays 6', entering the front aperture are internally reflected and focused at the rear aperture of the rear mirror, in which lens 13 is situated. The lens expands the image and focuses the light ray on sensor 9'. Because of its effect, the expander lens permits the rear aperture to be made smaller in size than otherwise.

Figures 4, 5, 6:
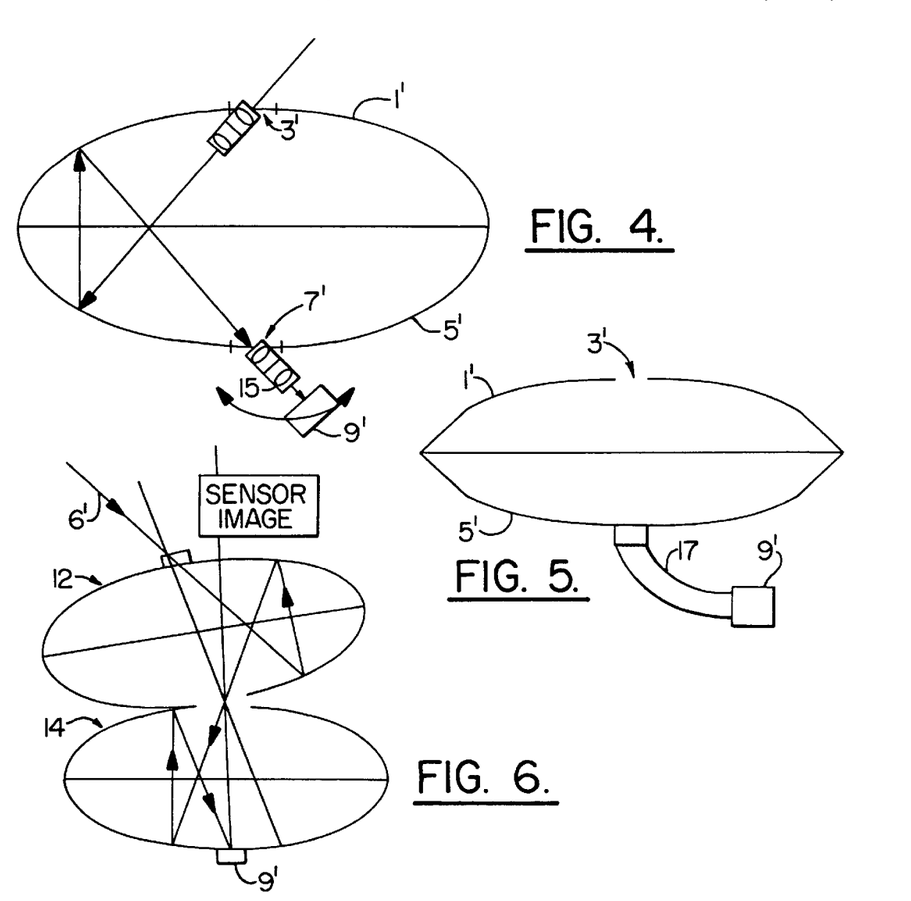
FIG. 4 illustrates another refinement of the embodiment of FIG. 1 that contains a rotatably mounted zoom type lens to focus light on the sensor.
FIG. 5 illustrates a modification of FIG. 1 that employs a fibre optic cable to further off-set the sensor.
FIG. 6 illustrates an embodiment in which multiple dual paraboloid mirror assemblies have tilted axes.

As shown in FIG. 4, the sensor lens 15 may be a zoom optics lens or a fixed focus optics lens that is rotatably mounted with its front end in the rear aperture. This permits detailed viewing and magnification within the assembly's optical field of regard. A fiber optic cable, a known light transmission medium, may be employed as part of the sensor apparatus to couple light appearing at the exit aperature to the sensor, as symbolically illustrated in FIG. 5. As shown an input end of fibre optic cable 17, which may be a flexible cable, is located in the rear aperture of the coupled mirrors. The cable's output end is directly coupled to the sensor. The foregoing permits the sensor to be located out of harm's way, protecting the sensor. Multiple dual paraboloid mirrors 12 and 14, as illustrated in FIG. 6 are positioned such that light rays 6' pass through turning angles. The use of multiple dual paraboloid relay mirrors, placed at angles, provides added versatility for protection, viewing and maintenance.

As desired, a diaphragm, such as used in a camera lens, can be added to the mirror's front aperture and/or to the sensor to regulate or change the amount of light entering the sensor and the field of view. Use of mirrors positioned at the vertex that can be rotated so as to provided a limited field of view within the field of regard, similar to that shown in FIG. 4. A rotatable mirror can be used in combination with an optical train.

Figures 7A, 7B:
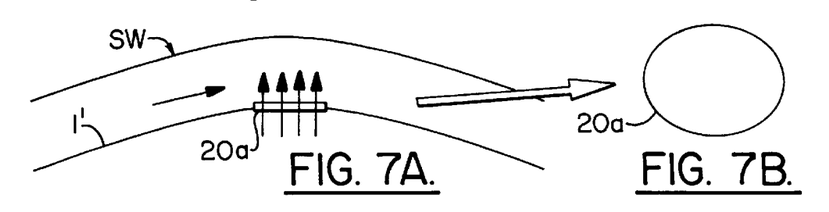
FIG. 7A and 7B illustrate a perforated aperture cover, useful in any of the preceding embodiments, in side section and, to enlarged scale, in top view, respectively.
Figure 8A:
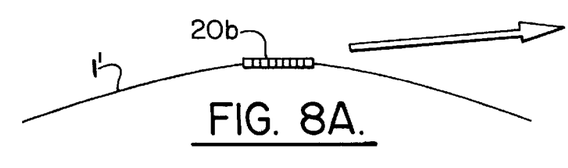
FIG. 8A and 8B illustrate a woven aperture cover, useful in any of the preceding embodiments, in side section and, to enlarged scale, in top view, respectively.
Figure 8B:
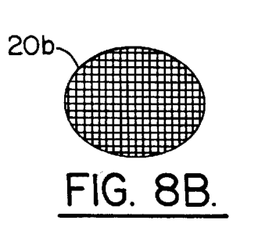
Figure 9A:
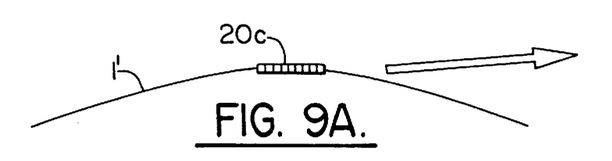
FIG. 9A and 9B illustrate a slotted aperture cover, useful in any of the preceding embodiments, in side section and, to enlarged scale, in top view, respectively.
Figure 9B:
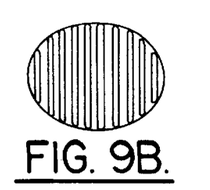

The front aperture may be covered with perforated material 20a, as illustrated in FIG. 7A, symbolically in section view, and, to enlarged scale, in top view in FIG. 7B; woven material 20b as in FIGS. 8A and 8B or a slotted material 20c, as illustrated in FIGS. 9A and 9B. Such coverings provide additional protection for the sensor, particularly if the sensor assembly is used with a coolant gas that is routed through the dual parabolic mirror assembly and out the front aperture, such as represented by the arrows in FIG. 7A.

Figures 10, 11:
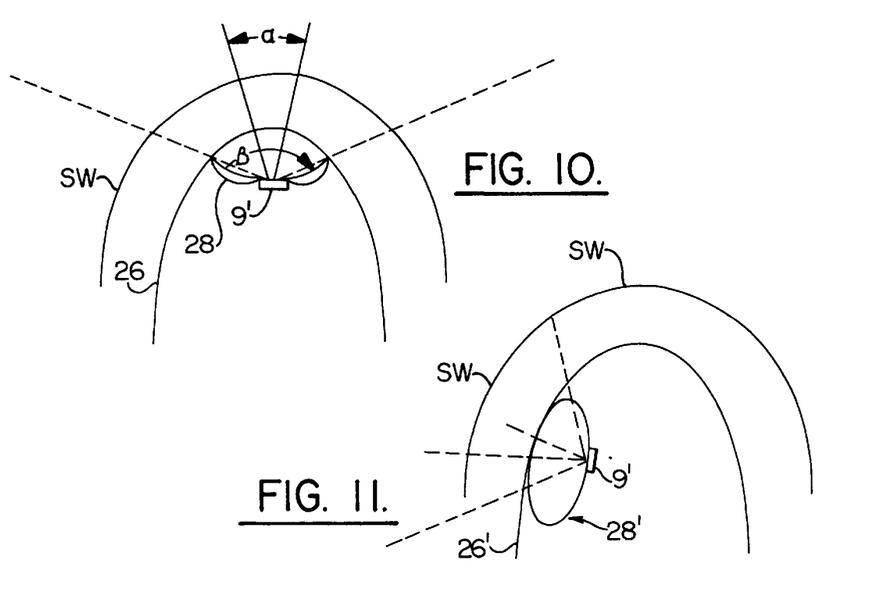
FIG. 10 shows the sensor support assembly as used in the tip of a missile nose cone.
FIG. 11 shows the sensor support assembly used in the side of a missile distant from the cone tip.

By providing transpiration cooling, rather than film cooling, additional benefits are gained, since such cooling technique is highly effective in severe environments, and, thus, less coolant is required. In high velocity missiles, the sensor, 9', may view through the covering while a coolant gas is forced through the dual mirror assembly to cool the missile nose cone, as partially illustrated symbolically in FIG. 10. The aperture of dual paraboloid mirror assembly 28 is located at the tip of the missile's nose cone 26, the stagnation region behind the bow shock SW. Alternatively, the aperture may be located down stream from the tip as partially symbolically illustrated in FIG. 11. The particular configuration selected is that which best meets the viewing requirements. In either construction, the coolant pressure offsets the aerodynamic pressure and allows a thinner, lighter material to be used.

For other applications, such as rocket or turbine engines, plasma furnaces, combustors, and various high temperature manufacturing processes, the same type of aperture covering can be used in conjunction with coolant flow. For example, in some combustion systems, it may be practical to inject the fuel and oxidizer through the aperture or other areas near or on the paraboloids and obtain a detailed view of the initial steps in the combustion process.

Figure 12:
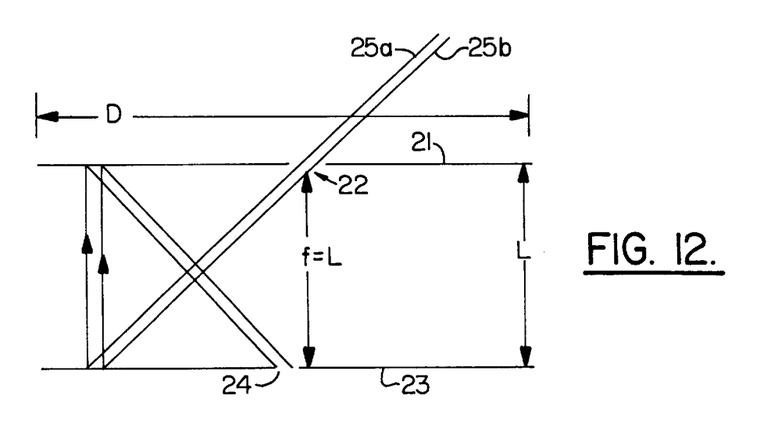
FIG. 12 symbolically illustrates a sensor assembly constructed with dual Fresnel type mirrors.

Fresnel mirrors may be substituted for the dual paraboloid mirror configuration of the prior embodiments with substantially equivalent effect. Reference is made to FIG. 12 in which two Fresnel mirrors, 21 and 23, symbolically illustrated, of predetermined length, D, and circular in shape, are spaced apart a distance, L and supported in that relationship with conventional supports, not illustrated. The Fresnel mirrors have their reflecting surfaces facing one another and have their focal length, f, equal to the mirror to mirror spacing, L. Mirror 21 contains a small centrally located circular aperture 22, the front aperture, and mirror 23 contains the small centrally located circular aperture 24, the back aperture. To complete the assembly, a sensor, such as sensor 9 of FIG. 1, is supported within aperture 24.

Figure 13:
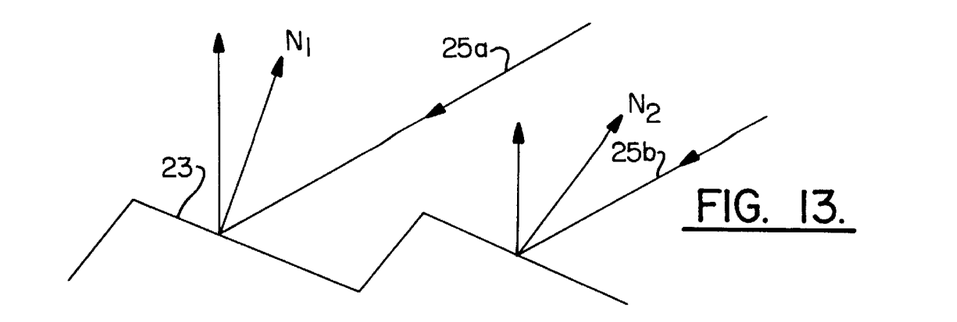
FIG. 13 is a partial section view of a Fresnel mirror drawn to larger scale to assist in understanding operation of the embodiment of FIG. 12.

As those skilled in the art appreciate, although the surface of the mirrors 21 and 23 are illustrated as flat in FIG. 12, the reflecting surfaces contain grooves that in section are triangular in shape as is illustrated in greater detail in the partial section view of FIG. 13, to which reference is briefly made. As illustrated the incident light rays, 25a and 25b, arriving at an angle to the normals of the Fresnel grooves, N1 and N2, are reflected vertically.

Returning to FIG. 12, light rays 25a and 25b entering front aperture 22 at an angle are incident upon the mirrored Fresnel surface of the bottom mirror 23 and are reflected orthogonal to the plane of the bottom mirror. The light rays arrive at the mirrored Fresnel surface of the upper mirror 21, perpendicular to the plane of that surface. They are re-reflected from that surface at an angle to that surface that directs the light rays to the focal point of mirror 21, a location coincident with the position of aperture 24, and, hence the pick up sensor, not illustrated. This is essentially the same manner as occurs with the dual paraboloid mirrors in the preceding embodiments.

The advantage of the Fresnel mirror configuration is that the focal length to diameter ratio can be varied to meet different conditions. In principle the Fresnel mirror concept shares the same advantages as the paraboloidal mirror arrangement, such as multiple units that are serially connected as in FIG. 2, selective reflection as in FIG. 4, and turning angle as in FIG. 6. An advantage to the Fresnel mirror arrangement is that it is more compact.

Figures 14, 15, 16:
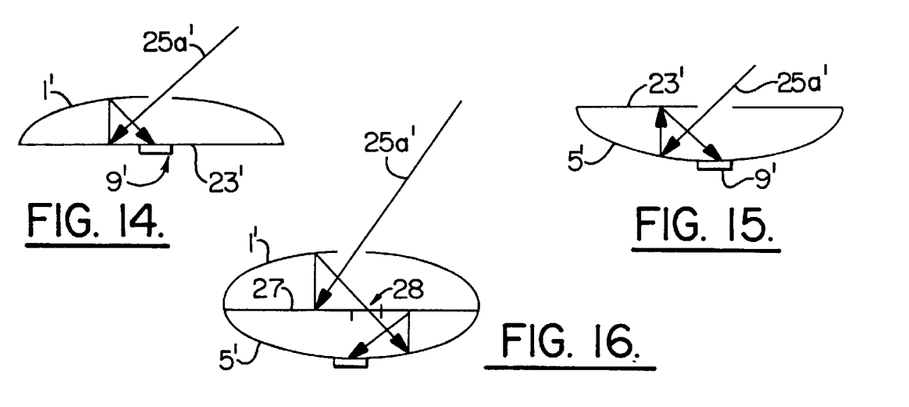
FIGS. 14, 15 and 16 symbolically illustrate additional embodiments that incorporate combinations of paraboloid mirrors and Fresnel mirrors.

In still further embodiments of the invention, the Fresnel mirror and paraboloidal mirror can be combined in various configurations to serve particular needs, such as allowing the assembly to fit within a predefined space. One such embodiment is illustrated in FIG. 14 in which the upper mirror 1' is paraboloid, such as found in FIG. 1, and lower mirror 23' is a Fresnel type as found in FIG. 12. And sensor 9' is positioned within the aperture in the lower mirror. In the embodiment of FIG. 15 the positions of the two types of mirrors are reversed. The upper mirror 23' is of the Fresnel type and lower mirror 5' is of the parabolic type. The two types of mirrors are combined in FIG. 16. Mirrors 1' and 5' are the paraboloidal mirrors as in the preceding embodiments. In this the central mirror 27 is a two sided mirror that has a Fresnel reflector on both its front and back surfaces, effectively combining Fresnel mirrors 23 and 21 of FIG. 12 back-to-back to form a single two sided reflector. If it is desired to physically isolate the upper cavity from the lower, a central light transparent region may be formed in the mirror 27 to substitute for the mirror's central aperture 28 illustrated.

Figure 17:
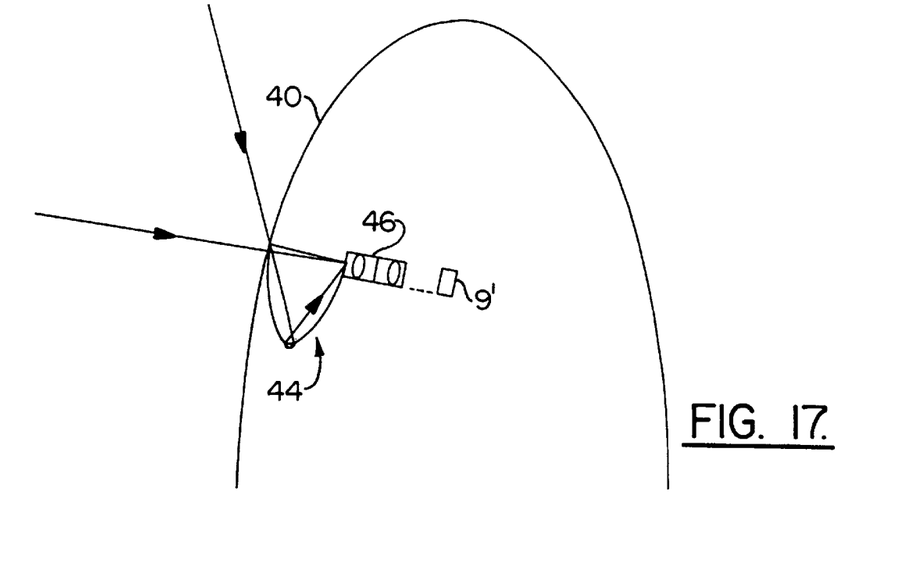
FIG. 17 illustrates a sensor support assembly having a restricted field of regard.

The dual paraboloid mirror offset sensor configuration can be modified in various ways to accommodate different fields of regard and provide selected fields of view. The embodiment of FIG. 17, mounted in missile 40, employs one-half of the dual paraboloid assembly 44 and a rotatably mounted mirror or lens 46 to transfer the view at the aperature, located in the figure at the upper left corner of the assembly, to sensor 9'. The structure suggests that the dual paraboloid assembly shown in FIG. 1 was sawed in half and the cut section was closed with a flat wall. In particular, the entire paraboloid is not necessary for restricted fields of regard, and a circular aperture is not required to accommodate such limited fields of regard. Since only a restricted field of view is needed, the remainder of the paraboloidal structure is eliminated with consequent weight and space savings.

The reflective material in each of the foregoing embodiments can be constructed of materials having particular attributes tailored to a specific application, without compromising the sensor's performance. As example, the reflective material selected may be one that is a bandpass material, one that absorbs radiation in all but one or more selected wave length bands, so that the sensor is exposed only to the preferred radiation. Then too, quarter wave reflectors can be incorporated to reflect light preferentially in various bands. Or a narrow band pass or broad band pass material can be placed between the two paraboloids to absorb selected wavelengths. Such approaches minimize the amount of coolant required by the sensor, since the amount of extraneous light is reduced. In particular, the sensor may be a photovoltaic cell that is active in the photovoltaic region of the radiant energy spectrum. By filtering out the extraneous light, which causes heating of the cell, performance losses are avoided. Energy absorbed by the paraboloid can be removed by standard techniques using conduction, convection and/or radiation thermal transfer techniques, depending upon the particular application, as may include heat fins or heat pipes and the like.

The outer surface of the paraboloids may be coated with additional materials or receive surface treatments that enhance cooling by re-radiation techniques, or to form heat fins to enhance cooling by convention.

The foregoing invention provides many benefits. The sensor is positioned remote from the severe environment. Little or no coolant is required. In many applications, a transparent window is not required. Thus the image distortion effects of coolant induced turbulence and window refractive index gradient are further diminished, resulting in greater clarity of the image obtained from the sensor. The sensor's field of view is quite large, even though the sensor is displaced from the aperture or window and is deeply embedded in a nose cone. Due to its location remote from the viewing aperture, the sensor is well protected from nuclear radiation, high temperature, thermal shock, high electric fields and high RF fields. Even so, the structure allows for cryogenic cooling for IR detectors.

The variety of applications that may benefit from the disclosed invention are many. Interceptor missiles can employ the sensors for IR and visible spectrum target viewing; combustion systems for viewing and radiometric measuring of combustion processes and temperature in turbine and rocket engines, oil, coal and gas fired boilers, pyrolizers; high temperature manufacturing processes such as alloy steel manufacture and production of ceramics; furnaces and ovens, for temperature monitoring and view furnace and oven interiors; video and photographic coverage of events in severe environmental conditions; nuclear event recording; monitoring the interiors of particle beam systems, RF cavities, RF amplifiers and the like.

Figure 16A:
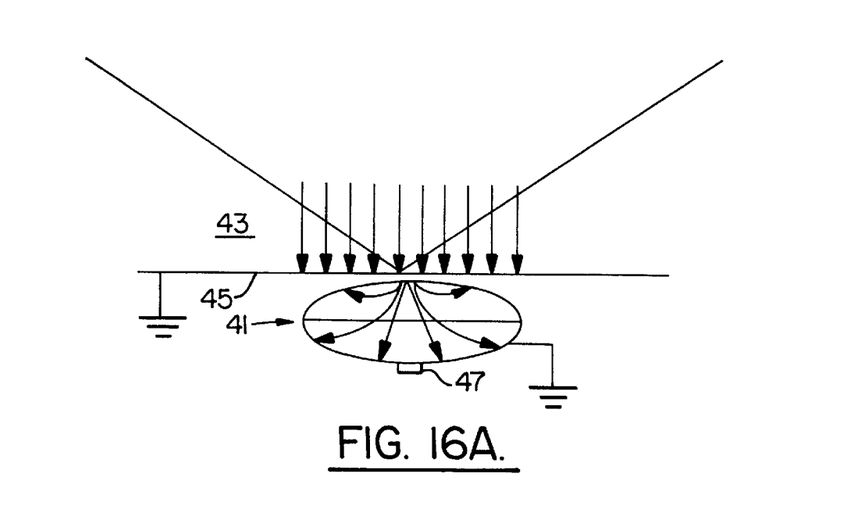
FIG. 16A shows the invention as applied to monitor the internal regions of a particle accelerator.

FIG. 16.5 symbolically ilustrates a sensing device 41 that senses the wall temperature or the light emitted by arcs within an RF amplifier or particle accelerator 43. The accelerator's metal wall 45, which separates the high vacuum region from the external ambient, contains a window through which conditions internal of the accelerator can be observed. The sensor apparatus is placed with its front aperature at that window, and the sensed radiant energy is translated, in the manner described in the preceeding embodiments, to the offset position of sensor 47. The sensor and the associated electronics, not illustrated, perform the desired function. As indicated in the figure, electric fields, E, may couple through the window to the external ambient. Those fields that enter the sensor device's dual paraboloid structure are diverted from sensor 47. The dual paraboloids serve the function of a Faraday cage having a small aperature and thereby serves to protect sensor 47 from deleterious effects of those electric fields.

Figure 18:
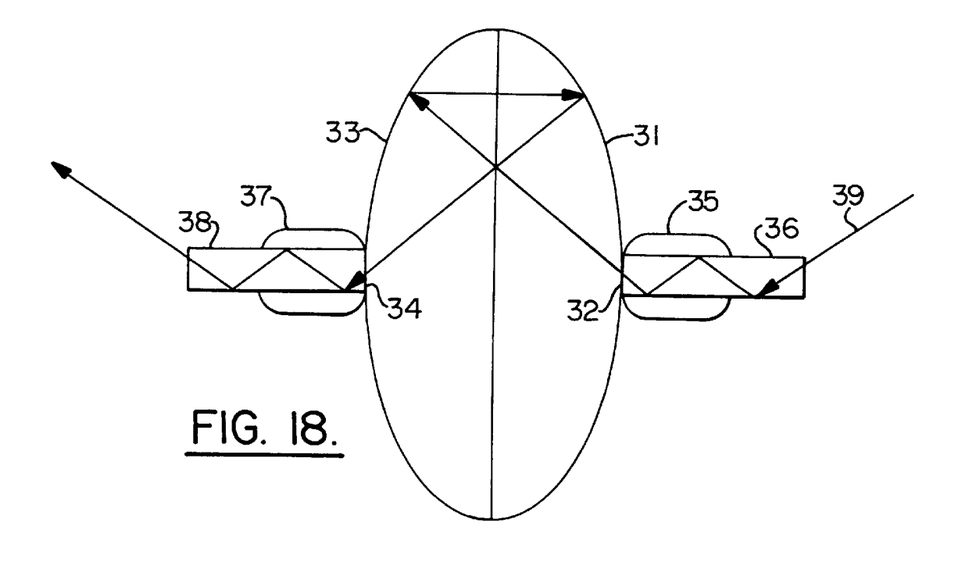
FIG. 18 illustrates an optic fiber coupling based on the dual paraboloid structure.

The dual paraboloidal mirror configuration is used as a means of joining two fiber optic elements, an optical coupling, as illustrated symbolically in FIG. 18. The junction includes the two paraboloid surfaces, whose inner surfaces are silvered and, hence, reflective of visible light, as in the preceding embodiments, excepting the front aperture 32 and rear aperture 34, which are small circular regions that are light transparent. Slip fit coupling tubes 35 and 37 are attached, respectively, to the outer surface of paraboloids 31 and 33, as by thermal welding, resin adhesive or the like, not illustrated. An end of optical fiber 36 is slid into coupling 35 and against aperture 32 and is permanently fixed thereto by any conventional technique, such as bonding, clamping or crimping. Likewise, optical fiber 38 is fitted to coupling 37 and permanently attached with its end abutting the output aperture 34. A beam of light 39 propagating through optical fiber 36 is coupled through the front aperture 32, is internally reflected within the reflective surfaces of the two paraboloids, and is outputted from the rear aperture 34 into optical fiber 38, in which the light ray continues its propagation. The dual paraboloid structure thus serves as an easy and effective coupling for connecting portions of an optical transmission line.

In other embodiments, a light source, placed side by side with the sensor, can be used to illuminate regions which are particularly hazardous. For example, viewing hazardous propellants or explosives with electric light sources and sensors introduce stray electric fields that may cause the hazardous chemicals or explosives to ignite or detonate. Those introduced electric fields or sensors may cause unwanted spurious electronic noise jeparodizing the accuracy of tests or experiments. Having the sensor and light source formed as real images offers a distinct advantage in such circumstances. An intense light source, such as a carbon arc or other lamp, is translated and the light is effectively refocused at the opposite vertex. Experiments and tests may be performed remote from the lamp, so as to avoid introduction of impurities to the experiments. With intense light sources, such as carbon arcs, melting of alloys, melting and cooling of special materials for forming crystals and the like can be conducted, while ensuring high purity. Additionally materials can be passed through the intense light zone without danger of physical contact with the lamp. By adding appropriate filters selected wavelengths may be focused at that region.

Electromagnetic energy or radiant energy as those terms are understood in the art encompasses the entire energy spectrum of energy having wave like characteristics, the broad spectrum of energies emitted by our sun in the ongoing hydrogen fusion explosions that provides energy to our planet. That includes those particular segments of the energy spectrum referred to as radio-frequency, microwave, infra-red, visible light, ultra-violet, x-ray and gamma radiation. As used herein, the term "light" is intended to encompass the same meaning as electromagnetic energy and radiant energy, not just the visible light spectrum, even though the particular embodiments illustrated are most easily constructed for the visible light spectrum. As those skilled in the art appreciate upon reading this specification, the principles of a dual paraboloid surfaces containing a silvered mirror surface that are reflective to visible light, are equally applicable to surfaces that are reflective to the other types of energy; as example, a gold surface paraboloid, which is reflective of microwaves. Given a particular spectrum of energy, if any, a judicious choice is made of the material that is to form the surface that is to be reflective of that energy and to the practicality of working that material to the dimensions required.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A sensor apparatus comprising:

first radiant energy reflector means having a reflective surface and defining a focal point spaced from said reflective surface of said first radiant energy reflector means, said first radiant energy reflector means also defining a transmissive aperture;

second radiant energy reflector means having a reflective surface and defining a focal point spaced from said reflective surface of said second radiant energy reflector means, said second radiant energy reflector means also defining a transmissive aperture aligned with the transmissive aperture of said first radiant energy reflector means;

said reflective surface of said first radiant energy reflector means being oriented facing said reflective surface of said second radiant energy reflector means and being spaced from said reflective surface of said second radiant energy reflector means by a predetermined distance such that said focal point of said first radiant energy reflector means coincides with said aperture in said second radiant energy reflector means;

sensor means, responsive to radiant energy appearing at said aperture in said second radiant energy reflector means, for producing a corresponding electrical signal representative of said radiant energy; and transmissive aperture covering means for covering said transmissive aperture in said first radiant energy reflector means, said covering means selected from the group consisting of a perforated material, a woven gas pervious material and a slotted material.

2. A sensor apparatus according to claim 1 further comprising coolant gas delivery means for directing coolant gas toward said transmissive aperture covering means and through the transmissive aperture defined by said first radiant energy reflector means.

3. A sensor apparatus according to claim 1 further comprising filter means positioned within said transmissive aperture defined by said first radiant energy reflector means for only permitting selected radiation to pass therethrough such that any unselected radiation is inhibited from passing therethrough.

4. A sensor apparatus according to claim 1 wherein said sensor means is positioned at the aperture defined by said second radiant energy reflector means.

5. A sensor apparatus according to claim 1 wherein said first and second radiant energy reflector means are substantially identical, and wherein each of said first and second radiant energy reflector means is paraboloid in geometry.

6. A sensor apparatus according to claim 1 wherein said first and second radiant energy reflector means are substantially identical, and wherein each of said first and second radiant energy reflector means comprises a Fresnel mirror.

7. A sensor apparatus according to claim 1 wherein one of said first and second radiant energy reflector means is paraboloid in geometry, and wherein the other of said first and second radiant energy reflector means comprises a Fresnel mirror.

8. A sensor apparatus according to claim 1 wherein said sensor means comprises:

a lens; and a sensor, said lens being located in said aperture defined by said second radiant energy reflector means at said focal point of said first radiant energy reflector means for focusing images on said sensor.

9. A sensor apparatus according to claim 8 wherein said sensor means further comprises support means for rotatably positioning said lens.

10. A sensor apparatus according to claim 1 further comprising a fiber optic cable coupled at one end to said sensor means.

11. A sensor apparatus comprising:

a first radiant energy reflector having a reflective surface and defining a focal point spaced from said reflective surface of said first radiant energy reflector, said first radiant energy reflector also defining a transmissive aperture;

a second radiant energy reflector having a reflective surface and defining a focal point spaced from said reflective surface of said second radiant energy reflector, said second radiant energy reflector also defining a transmissive aperture aligned with the transmissive aperture of said first radiant energy reflector;

said reflective surface of said first radiant energy reflector being oriented facing said reflective surface of said second radiant energy reflector and being spaced from said reflective surface of said second radiant energy reflector by a predetermined distance such that said focal point of said first radiant energy reflector coincides with said aperture in said second radiant energy reflector;

a sensor, responsive to radiant energy appearing at said aperture defined by said second radiant energy reflector, for producing a corresponding electrical signal representative of said radiant energy;

a transmissive aperture covering for covering said transmissive aperture defined by said first radiant energy reflector, thereby protecting said sensor; and a coolant gas source for directing coolant gas toward said transmissive aperture covering and through the transmissive aperture defined by said first radiant energy reflector.

12. A sensor apparatus according to claim 11 wherein said transmissive aperture covering is selected from the group consisting of a perforated material, a woven gas pervious material and a slotted material.

13. A sensor apparatus according to claim 11 further comprising a filter positioned within said transmissive aperture defined by said first radiant energy reflector for only permitting selected radiation to pass therethrough such that any unselected radiation is inhibited from passing therethrough.

14. A sensor apparatus according to claim 11 wherein said sensor is positioned at the aperture defined by said second radiant energy reflector.

15. A sensor apparatus according to claim 11 wherein said first and second radiant energy reflectors are substantially identical, and wherein each of said first and second radiant energy reflectors is paraboloid in geometry.

16. A sensor apparatus according to claim 11 wherein said first and second radiant energy reflectors are substantially identical, and wherein each of said first and second radiant energy reflectors comprises a Fresnel mirror.

17. A sensor apparatus according to claim 11 wherein one of said first and second radiant energy reflectors is paraboloid in geometry and wherein the other of said first and second radiant energy reflectors comprises a Fresnel mirror.

18. A sensor apparatus according to claim 11 further comprising a fiber optic cable coupled at one end to said sensor.

19. A sensor apparatus comprising:

a first radiant energy reflector having a reflective surface and defining a focal point spaced from said reflective surface of said first radiant energy reflector, said first radiant energy reflector also defining a transmissive aperture;

a second radiant energy reflector having a reflective surface and defining a focal point spaced from said reflective surface of said second radiant energy reflector, said second radiant energy reflector also defining a transmissive aperture aligned with the transmissive aperture of said first radiant energy reflector;

said reflective surface of said first radiant energy reflector being oriented facing said reflective surface of said second radiant energy reflector and being spaced from said reflective surface of said second radiant energy reflector by a predetermined distance such that said focal point of said first radiant energy reflector coincides with said aperture in said second radiant energy reflector;

a sensor, responsive to radiant energy appearing at said aperture defined by said second radiant energy reflector, for producing a corresponding electrical signal representative of said radiant energy;

a transmissive aperture covering for covering said transmissive aperture defined by said first radiant energy reflector, thereby protecting said sensor; and a rotatable lens, disposed within the transmissive aperture defined by at least one of said first and second radiant energy reflectors, for selecting a field of view within a broader field of regard.

* * * * *

UNITED STATES PATENT AND TRADEMARK OFFICE
CERTIFICATE OF CORRECTION

PATENT NO. : 5,980,049
DATED : November 9, 1999
INVENTOR(S) : Blackmon, Jr.

It is certified that error appears in the above-identified patent and that said Letters Patent is hereby corrected as shown below:

On the title page, [73] Assignee, "St. Louis, Mich." should read --St. Louis, Mo.--.

Signed and Sealed this

Eleventh Day of July, 2000

Attest:

Q. TODD DICKINSON

*Attesting Officer*  *Director of Patents and Trademarks*